June 19, 1928.
T. MIYAGUCHI
1,674,119
METHOD OF MAKING FERROBORON AND BORON STEEL
Filed Oct. 19, 1921
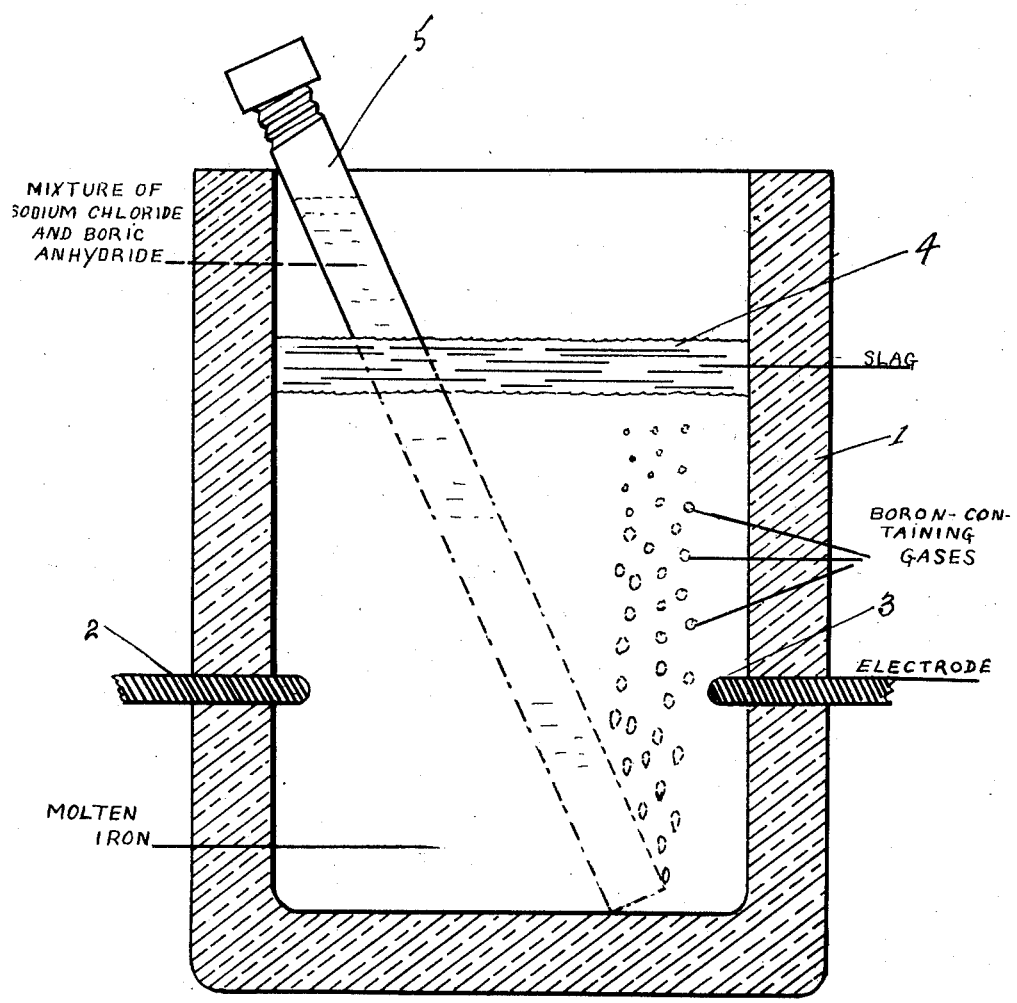
Inventor
Takeo Miyaguchi
by
Lawrence Langner
Attorney Patented June 19, 1928.

UNITED STATES PATENT OFFICE.

TAKEO MIYAGUCHI, OF TOKYOFU, JAPAN.

METHOD OF MAKING FERROBORON AND BORON-STEEL.

Application filed October 19, 1921. Serial No. 508,818.

The invention relates to method of making ferro-boron or boron steel by subjecting molten iron or steel to the action of the gases generated by heating a mixture of boric anhydride or boric acid compound with sodium chloride.

The object of the invention is to manufacture ferro-boron or boron steel in a very simple manner and very economically on an industrial scale.

It has been hitherto very difficult to manufacture ferro-boron or boron steel due to the fact that the fusing point of boric anhydride or boric acid compound used in the process is very low and the fusing temperature is in the neighborhood of vaporization temperature so that the range between these temperatures is very slight.

On this account there was a prize competition in the United States of America as to the method of producing ferro-boron which appeared in "The ferro-alloys" in "General Electric Review" published in November, 1918. I have made quite exhaustive and elaborate experiments and investigations on the method of producing the above substances and have finally succeeded, as hereinafter mentioned, by the employment of sodium chloride in conjunction with boric anhydride or a compound of boric acid. So far as I am aware, the method disclosed in this application has not heretofore been proposed and I venture to say that I am the first to have succeeded in making ferro-boron and boron steel at least on industrial scale.

I considered that excellent results can be obtained by using ferro-boron in the art of steel manufacture, so I have made extensive tests in that line. The first method I adopted was the reduction of boron in boric acid with aluminium and the utilization of the reduced substance to act directly on molten steel. But in this method there was difficulty in the separation of boron from the resulting slag, and further in view of the specific gravity of boron being very low, boron combined and underwent reaction only on the slag on the surface of molten iron or steel so as not to have a tendency to act in the interior of the latter, thereby giving great inconvenience and difficulty which could not be eliminated in the treatment. Moreover the material used being aluminium which is a relatively expensive metal, the produced ferro-boron was also expensive.

I have attempted another method by intimately mixing boric anhydride with pulverized carbon and fusing the mixture with metals such as iron or steel in an electric furnace but the result has not been successful. The reason is accounted for by the fact that although carbon used to be generally preferred as reducing agent, yet in this case the action of reducing boron in boric acid is very slow, thereby giving a tendency of vaporizing the boron in course of heat treatment so as to produce an unsuccessful result. The other method I have adopted was the mixing of molten iron or steel or other metals with a mixture of boric acid and sodium carbonate which latter mixture had been previously brought in molten state, in order to combine boron into molten iron or steel, but this method was also unsuccessful. Furthermore I have experimented with the employment of lime chloride or ferro-silicon which does not bring about so good results as that in the present invention.

According to my invention, I use a charge consisting of a mixture of boric anhydride or compound of boric acid and sodium chloride and the charge is heated in a suitable receptacle. The gases evolved during the treatment are brought into intimate contact with molten iron or steel to produce ferro-boron or boron steel. In order to subject the molten iron or steel to the action of these gases, the mixture is charged into a receptacle which is then immersed into a mass of molten iron or steel and heated to evolve and diffuse the gases. Or as an alternative, gases may be conducted into molten iron direct from a receptacle in which the gases have been generated by heating the above charge. Either method may be easily carried out in an electric furnace or crucible furnace.

In the drawing which represents simplified apparatus within which the process of the invention may be experimentally performed, the sole figure is a vertical section through an electric furnace 1, the electrodes being designated by the characters 2 and 3. A charge consists for example, of about 232 pounds of pig iron. This is preheated and fused in the furnace and a suitable slag indicated at 4 in the drawing is made to cover the surface of the above molten iron so as to conserve the heat imparted thereto and not to oxidize the molten iron or steel.

Then I took five pieces of iron pipes one of which is represented at 5, each of approximately 4 inches in inner diameter and closed at one end, in which pipes a mixture of approximately 29 pounds of sodium chloride and 31 pounds of boric anhydride is completely and firmly packed and the pipes thus charged with above materials are suitably preheated.

The pipes will be successively immersed within the molten iron, whereby boron containing gases evolved from the heated charge will combine with the molten iron to produce ferro-boron into which the above iron pipes will be also melted to form a constituent. By this method I have succeeded in obtaining pig iron containing approximately 10 per cent of boron.

According to the experiments so far made, in the manufacture of ferro-boron, there is better efficiency in case where the hearth of the furnace has a greater depth compared with the surface area, such as a crucible commonly used for fusion of iron or steel. On that account it is preferred to deepen the bottom of the furnace. It is also preferable to give a thick layer of the slag used for conserving the heat imparted to molten charge.

Claims:

1. A method of making ferro-boron or boron steel comprising subjecting molten iron or steel to the action of gases evolved by heating a mixture comprising a boric compound and sodium chloride.

2. A method according to claim 1, the mixture being immersed in the molten mass of iron or steel.

3. A method according to claim 1, the gases evolved from the mixture being fed directly into the molten iron or steel so as to make intimate contact therewith.

4. A method of making ferro-boron or boron steel comprising, directly subjecting molten iron or steel to the action of gases evolved by heating a mixture comprising a boric compound and sodium chloride.

Signed at the embassy of the United States of America in the Empire of Japan this 26th day of September A. D. 1921.

TAKEO MIYAGUCHI.